United States Patent [19]

Karasawa et al.

[11] Patent Number: 4,870,577
[45] Date of Patent: Sep. 26, 1989

[54] ECR IN WHICH ARTICLE DATA STORED IN A MEMORY IS ALTERED ACCORDING TO SALES DATA

[75] Inventors: Hideo Karasawa, Mishima; Yuzo Minakuch, Shizuoka, both of Japan

[73] Assignee: Tokyo Electric Co., Ltd., Tokyo, Japan

[21] Appl. No.: 191,806

[22] Filed: May 6, 1988

Related U.S. Application Data

[63] Continuation of Ser. No. 837,073, Mar. 6, 1986, abandoned.

[30] Foreign Application Priority Data

Mar. 14, 1985 [JP] Japan ................................. 60-51137
Jul. 11, 1985 [JP] Japan ................................. 60-153155

[51] Int. Cl.⁴ .............................................. G07G 1/14
[52] U.S. Cl. .................................................. 364/405
[58] Field of Search .............................. 364/404, 405

[56] References Cited

U.S. PATENT DOCUMENTS

| | | | |
|---|---|---|---|
| 4,008,460 | 2/1977 | Bryant et al. | 364/200 |
| 4,186,438 | 1/1980 | Benson et al. | 364/200 |
| 4,398,250 | 8/1983 | Hosono | 364/404 |
| 4,468,750 | 8/1984 | Chamoff et al. | 364/405 X |
| 4,502,120 | 2/1985 | Ohnishi et al. | 364/405 |
| 4,524,367 | 6/1985 | Horiya et al. | 346/76 PH |

OTHER PUBLICATIONS

European Patent Search Report for EP 195371, search report published Jul. 20, 1988.

*Primary Examiner*—Clark A. Jablon
*Attorney, Agent, or Firm*—Frishauf, Holtz, Goodman & Woodward

[57] ABSTRACT

A POS system includes a center file and a file control unit, and a plurality of electronic cash registers each including a memory having a predetermined number of data areas each for storing article data, and a control circuit which, when it is detected that the article data corresponding to the input article code is stored in the memory, executes the sales data processing operation on the basis of this article data. The file control unit supplies the corresponding article data to the control circuit in accordance with the input inquiry information. When it is detected that the article data corresponding to the input article code is not stored in the memory, the control circuit supplies the input article code as the inquiry information to the file control unit and writes the article data supplied from this file control unit into the memory.

8 Claims, 13 Drawing Sheets

FIG. 5

| ARTICLE CODE | ARTICLE NAME | UNIT PRICE | STATUS | TIME |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |

FIG. 6

| ARTICLE CODE | ARTICLE NAME | UNIT PRICE | STATUS | NUMBER OF SALES | AMOUNT OF SALES |
|---|---|---|---|---|---|
| | | | | | |
| | | | | | |
| | | | | | |
| | | | | | |
| | | | | | |
| | | | | | |
| | | | | | |
| | | | | | |
| | | | | | |
| | | | | | |
| | | | | | |

F I G. 14

| ARTICLE CODE | ARTICLE NAME | UNIT PRICE | STATUS | COUNT |
|---|---|---|---|---|
| | | | | |
| | | | | |
| | | | | |
| | | | | |
| | | | | |
| | | | | |
| | | | | |
| | | | | |

ECR IN WHICH ARTICLE DATA STORED IN A MEMORY IS ALTERED ACCORDING TO SALES DATA

This application is a continuation of application Ser. No. 837,073 filed Mar. 6, 1986, now abandoned.

BACKGROUND OF THE INVENTION

The present invention relates to a Point of Sale (POS) system having a plurality of cash registers connected to a single file control unit.

As shown in FIG. 1, in point of sale (POS) systems used for sales data registration in, for example, department stores or supermarkets or the like, electronic cash registers (ECR) 1 are connected to single file control unit 3 via transmission path 2. Center file 4 is provided in a memory section such as a magnetic disk recording device in file control unit 3. Center file 4 stores article data such as article names, unit prices and the like of all articles to be sold and registered by each ECR 1, and sales data such as the number of sold articles, amount of sales and the like for every article code such as a price look-up (PLU) code. Back-up file 5 is used when article data stored in center file 4 cannot, for some reason, be searched, or when the number of sold articles or the amount of sales under each article code, based on the article data, cannot be collected.

When the article code of the article sold to a customer is inputted to each ECR 1 by operating a keyboard's keys or by using a bar code scanner as an input device, this article code is transmitted as article data inquiry information from the ECR to file control unit 3 through transmission path 2. After reception of the inquiry information from each ECR 1, file control unit 3 searches center file 4 on the basis of the article code of the inquiry information. The article data corresponding to the article code is read out and sent to the relevant ECR 1. After reception of the article data, ECR 1 then executes the sales data processing operation using the article name, unit price, etc., of this article data. After completion of the sales data processing operation, sales data such as the amount of sales, number of sold articles, etc., is sent from ECR 1 to file control unit 3, together with the article code. File control unit 3 then accumulatively stores the number of sold articles and the amount of sales into the number-of-articles area and the amount of sales areas which are provided in center file 4 and designated by the relevant article code. In this manner, the sales data registration process for one article is completed.

In such a POS system, since data is transferred between each ECR 1 and one file control unit 3 to execute the sales data registration process, the amount of data transmitted through transmission path 2 increases remarkably, bringing about a concomitant increase in the loads of transmission path 2 and an unshown line control circuit. Thus, if transmission path 2 and the line control circuit fail, sales data registration in each of electronic cash registers 1 cannot be executed.

As a general means of avoiding such a problem, the arrangement shown in FIG. 2, where each electronic cash register 7, connected to file control unit 6 through transmission path 2, is equipped with its own terminal file 8, can be employed. The article data of all articles is filed for every article code in terminal file 8. When an article code is inputted via the keyboard or bar code scanner of one ECR 7, corresponding article data such as article name, unit price, etc., is read out by searching terminal file 8 of the given ECR according to the article code, thereby executing the sales data processing operation. This ECR 7 then sends the sales data of the number of sold articles, amount of sales and the like to file control unit 6 through transmission path 2 in a manner similar to the above. File control unit 6 then updates the number of sold articles and the amount of sales of the relevant article of center file 9, based on the received sales data.

Using the POS system described above there is no need for each ECR 7 to transfer article data inquiry information to file control unit 6, or for file control unit 6 to transmit the article data to each ECR 7. As a result, the amount of data transmitted by transmission path 2 is markedly reduced.

However, the following problems still remain, even the POS system in which each ECR 7 has been equipped with its own terminal file 8. Namely, in so far as it is necessary to store the article data of all articles to be sold at the shop into each ECR 7's terminal file 8, each terminal file 8 needs a memory capacity which is substantially the same as that of center file 9, provided for file control unit 6. The problems of a need to increase the size of each ECR 7, and an accompanying increase in manufacturing costs, become paramount.

In addition, since the unit prices of articles are frequently changed in supermarkets or the like, it is necessary to change the unit prices stored in each ECR 7's terminal file 8 every time the unit prices are changed. As this procedure is fairly complicated, it not only increases the workload of the operator but also induces a deterioration in the working efficiency of the whole sales data processing operation. This latter problem is particularly worrisome with respect to the probability of misoperation, which increases each time unit prices have to be changed.

SUMMARY OF THE INVENTION

It is an object of the present invention to provide a POS system which can reduce the amount of data transmitted between each electronic cash register and the file control unit without need of having to remarkably increase the memory capacity of each ECR, thereby making it possible to improve the working efficiency of the whole of the sales data registration process.

This object is accomplished by a POS system comprising a file control circuit which includes a center file for storing article data such as unit prices and the like of articles corresponding to article codes, and a file control unit for reading out the corresponding article data from the center file in accordance with input inquiry information; and a plurality of electronic cash registers, each of which is connected to the file control circuit and has an input device for inputting article codes, a memory having a predetermined number of data areas for storing article data, and a control unit for searching the article data in the memory in accordance with an article code inputted from the input device and, when it is detected that the article data corresponding to this input article code is stored in the memory, executing the sales data processing operation based on this article data, and, alternatively, when it is detected that the article data corresponding to the input article code is not stored in the memory, transferring this article code, as inquiry information, to the file control unit; storing the article data generated from the file control unit in accordance with this inquiry information into an available data area in the memory and, at the same time, executing the sales data processing operation based on this article data.

In this invention, since article data for articles actually sold is sequentially stored into the memory, only a predetermined amount of article data, that relating to the most frequently sold articles, needs be stored into the memory. Therefore, the number of data areas in this memory need not be as great as when data pertaining to all articles is registered. Because only article data relating to the most frequently sold articles is stored into the memory, the sales data processing operation is streamlined and made more efficient.

BRIEF DESCRIPTION OF THE DRAWINGS

FIG. 5 is a memory map of a temporary storage memory, used in the ECR shown in FIG. 4;

FIG. 6 is a memory map of a center file in the POS system shown in FIG. 3;

FIG. 14 is a memory map of a temporary storage memory for use in the ECR shown in FIG. 13;

DETAILED DESCRIPTION OF THE PREFERRED EMBODIMENTS

Figure 1:
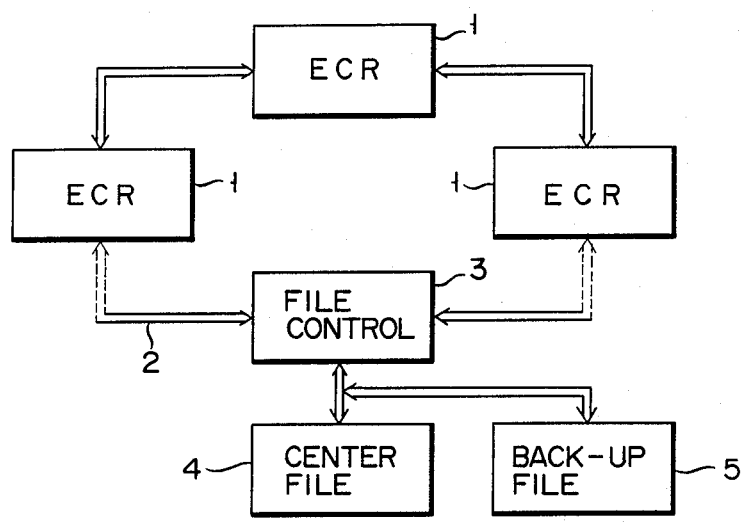
FIG. 1 is a block diagram of a conventionally well known POS system having a plurality of electronic cash registers and a file control unit.
Figure 2:
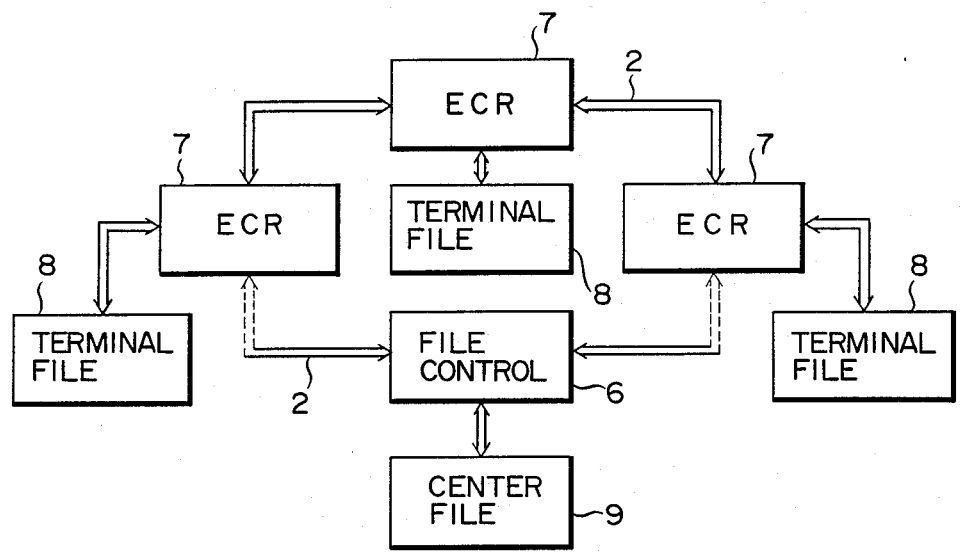
FIG. 2 is a block diagram of a POS system in which each electronic cash register has a terminal file.
Figure 3:
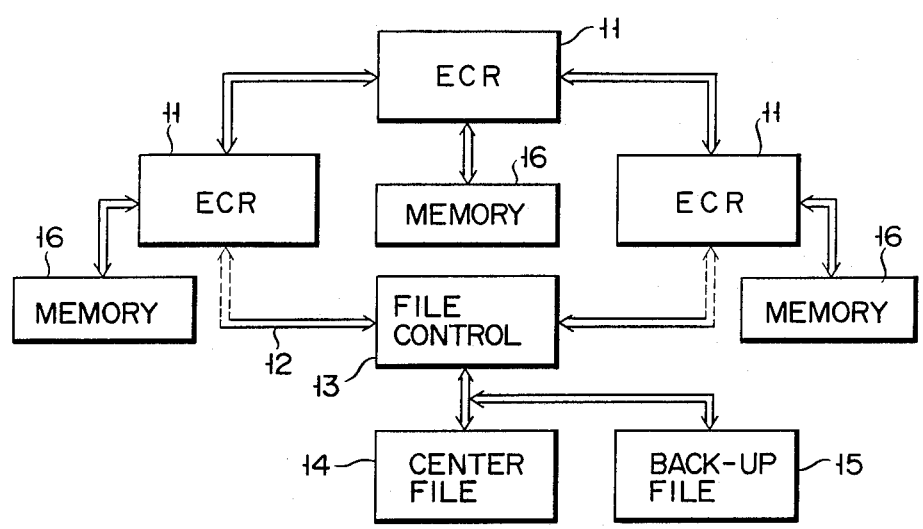
FIG. 3 is a block diagram of a POS system according to an embodiment of the present invention.

FIG. 3 is a block diagram of a POS system according to an embodiment of the present invention. Electronic cash registers (ECR) 11 are connected to file control unit 13 via transmission path 12. Center file 14 is provided in a memory section such as a magnetic disk recording device in file control unit 13. Center file 14 stores article data such as article names, unit prices and the like of all articles to be sold and registered by each ECR 11, and sales data such as the number of sold articles, amount of sales and the like for each article code such as a PLU code. Back-up file 15 is used when article data stored in center file 14 cannot, for some reason, be searched, or when the number of sold articles or amount of sales under each article code cannot be collected. Further, temporary storage memory 16, composed of a RAM, a magnetic disk recording device, or the like, is provided for each ECR 11.

Figure 4:
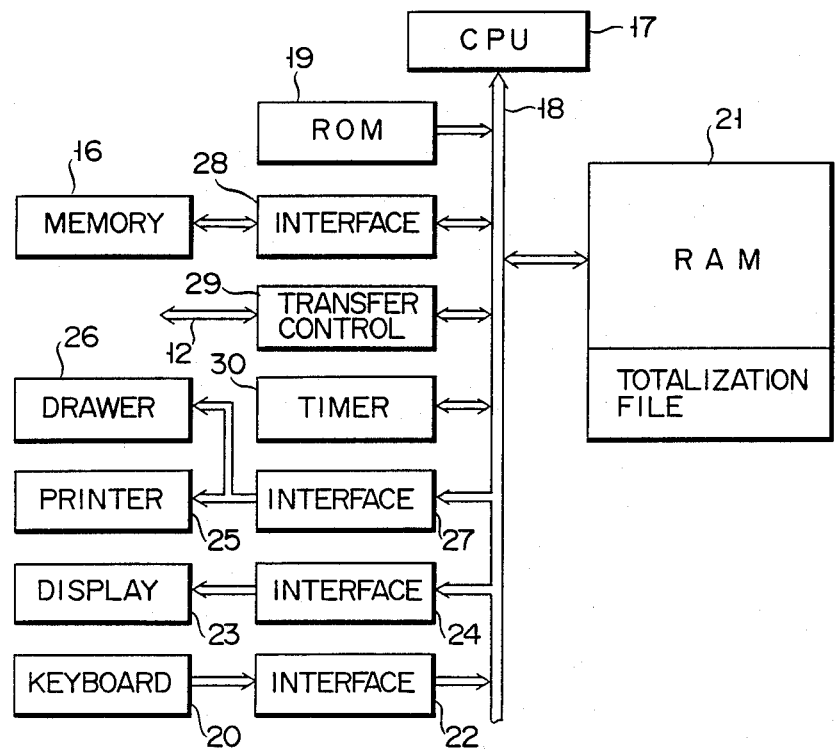
FIG. 4 is a block diagram of an electronic cash register used in the POS system shown in FIG. 3.

FIG. 4 is a block diagram showing each ECR 11. Central processing unit (CPU) 17 executes various kinds of arithmetic operating processes and controls the following components through bus line 18; ROM 19 for storing fixed data such as a control program; a RAM 21 for temporarily storing variable data such as an article code inputted via keyboard 20; keyboard interface 22 to which a key signal from keyboard 20 for key-inputting the article code of the article sold to one customer, or for starting the tendering operation is supplied; display section interface 24 for supplying display data to display section 23 which, in turn, displays the name and unit price of the sold article, the amount of sales, and the like; printer/drawer interface 27 for driving printer 25 to print and output the article name, unit price, amount of sales and the like onto a receipt, and cash drawer 26; memory interface 28 of memory 16; transfer control circuit 29, connected to transmission path 12; timer 30 for counting time to indicate the current time.

As shown in FIG. 5, data areas 31 and time areas 32 are formed in memory 16. Data area 31 stores article data including the article name, unit price, and status of the relevant article for each article code such as a PLU code. The status of the article indicates the sale condition of the article with respect to, for example, tax rate and discount rate. Time area 32 stores the time when the article data in data area 31 is searched. A predetermined, constant number of, for example, e.g., one hundred data areas 31 and time areas 32 are provided.

As shown in FIG. 6, data areas 33 and sales data areas 34 are formed in center file 14 which is provided for file control unit 13. Data area 33 stores article data including the article name, unit price, and status of the relevant article for each article code, such as the PLU code, corresponding to each article to be registered by one of ECR's 11. Sales data area 34 accumulatively stores the number of sold articles and the amount of sales.

Figure 7:
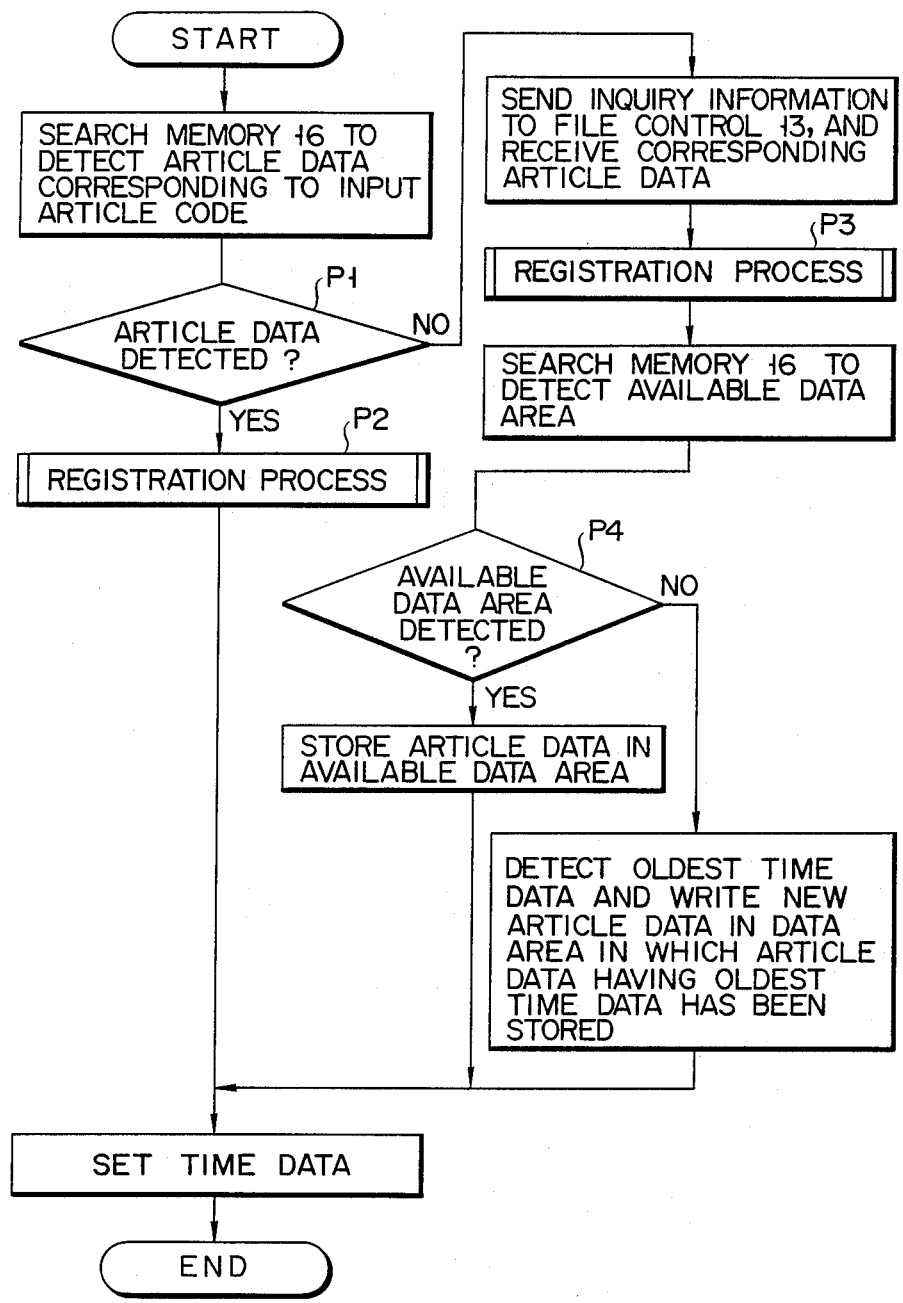
FIG. 7 is a flowchart of the registering operation executed by the ECR shown in FIG. 4, in accordance with the input article code.

When the article code of the sold article is inputted from keyboard 20 through keyboard interface 22 to CPU 17 of ECR 11, CPU 17 executes the registration process for one article in accordance with the flowchart of FIG. 7. Namely, memory 16 is searched on the basis of the article code inputted. When the relevant article code is detected in memory 16 in step P1, article data corresponding to this article code and including article name, unit price and status is read out from data area 31. The sales data registration process shown in FIG. 8 is executed on the basis of this article data in step P2.

Figure 8:
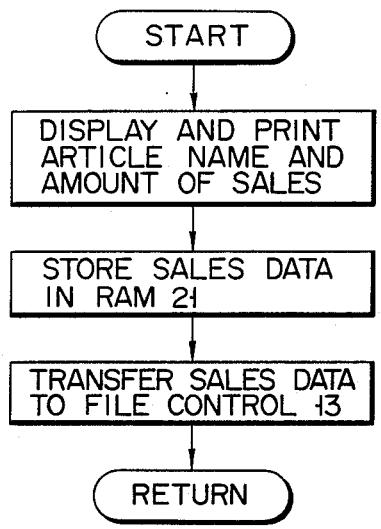
FIG. 8 is a flowchart of the sales data processing operation in FIG. 7.

In the sales data registration process in FIG. 8, CPU 17 allows the article name included in the article data and the amount of sales obtained from the unit price to be displayed in display section 23. CPU 17 also allows printer 25 to print and output the article name and the amount of sales onto a receipt. Next, CPU 17 registers sales data, such as the number of sold articles and the amount of sales, into the sales totalization file formed in RAM 21 of each ECR 11. After completion of the registration into its own sales totalization file, the sales data is transferred to file control unit 13 through transfer control circuit 29 and transmission path 12, thereby allowing file control unit 13 to update the number of sold articles and the amount of sales in sales data area 34 of the relevant article code in center file 14.

After completion of the sales data registration process in step P2 in FIG. 7, the current time is read out from timer 30 and stored into time area 32 of the relevant article code in memory 16. In this manner, the sales data registration process of one article is completed.

If the relevant article code is not detected in memory 16 in step P1, the inquiry information including this article code is transferred to file control unit 13. When the article data of the relevant article code read out from center file 14 for file control unit 13 is inputted through transmission path 12 and transfer control circuit 29, CPU 17 executes the same sales data registration process as that in step P2 using the article data inputted in step P3. After the end of the process in step P3, available data area 31 in memory 16 is searched. When available data area 31 is detected in step P4, the article data obtained from file control unit 13 at this time is stored into this available data area 31. The current time is simultaneously read out from timer 30 and stored into time area 32 corresponding to the relevant article data.

When no available data area 31 is detected in memory 16 in step P4, the article data stored in data area 31 corresponding to the oldest time data among the time data stored in all time areas 32 is deleted, then the new article data which is inputted from file control unit 13 at this time is written into the data area 31 in which the article data having the oldest time data has been stored. At the same time, the current time data read out from timer 30 is stored into time area 32 corresponding to the relevant data area 31.

Since the tendering operation to obtain the amount of sales or the like of the articles sold to one customer is the same as the ordinary tendering routine, its description is omitted.

In the POS system constituted as described above, although the article data and sales data for all articles which are sold by each ECR 11 are stored in center file 14 provided for file control unit 13, the article data of the article which was inquired from ECR 11 to file control unit 13 and the time data indicative of the time when each article data was searched are stored in memory 16 of each ECR 11. This time data is updated to the new time data when the article data is newly searched with regard to this article. Therefore, the new time data is always stored into time area 32 corresponding to the article data of the article which is frequently searched, namely, the article which is frequently sold. On the contrary, the time data of the article which is not so frequently searched has few opportunities of updating, so that it becomes old as the time elapses.

On the other hand, when no available data area 31 is provided in memory 16, the article data having the oldest search time data is replaced by the new article data. Consequently, the article data of the articles which are frequently sold is always stored in memory 16. Thus, this results in a remarkable reduction in number of inquiring operations of the article data effected by each ECR 11 with respect to file control unit 13 and results in a decrease in amount of data which is transferred through transmission path 12. At the same time, the number of processes in each ECR 11 and file control unit 13 can be reduced and the processing efficiency of the whole POS system can be improved. Thus, a larger number of electronic cash registers 11 can be connected to single file control unit 13 in the POS system.

In addition, in the POS system of the invention, even if transmission path 12 is damaged, each ECR 11 can perform the sales data processing operation with respect to the article data stored in its own memory 16, so that a rate of occurrence of troubles to the customer decreases.

Figure 9:
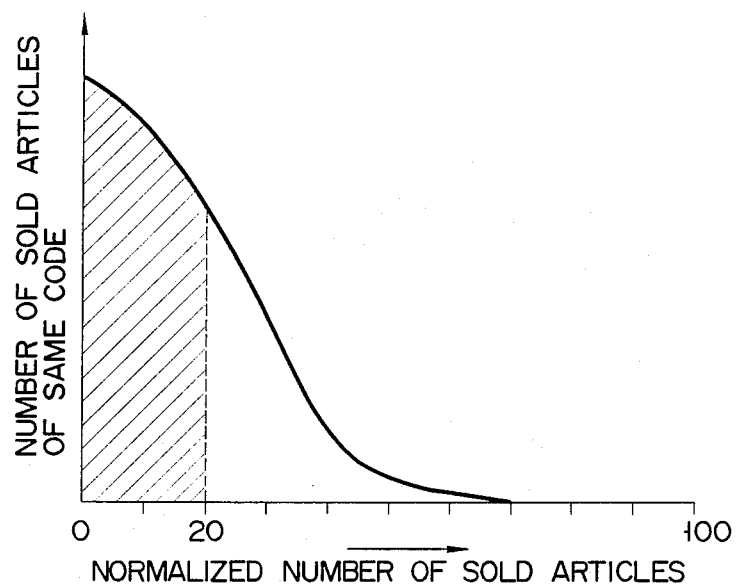
FIG. 9 is a graph showing the relation between the total number of sold articles of all article codes and the number of sold articles of the same article code.

FIG. 9 is a graph showing the relation between the number of sold articles of the same article code in a predetermined period and the normalized number of article codes which are arranged in a sequence of the number of articles which were frequently sold. As will be obvious from this graph, the number of sold articles of some article codes which are frequently sold occupy a considerably large percentage of the total number of sold articles. For example, the number of articles within a range of normalized number of 0 to 20 corresponds to more than 60% of the total number of sold articles as shown by the hatched portion. Therefore, for example, if data areas 31 of the number corresponding to 20% of the total number of all articles are provided in memory 16 of each ECR 11, it becomes unnecessary to inquire the article data to file control unit 13 with respect to 60% or more of articles to be sold and registered by each ECR 11. Thus, the number of inquiry times can be extremely reduced by merely providing memories 16 having a small memory capacity.

Figure 10:
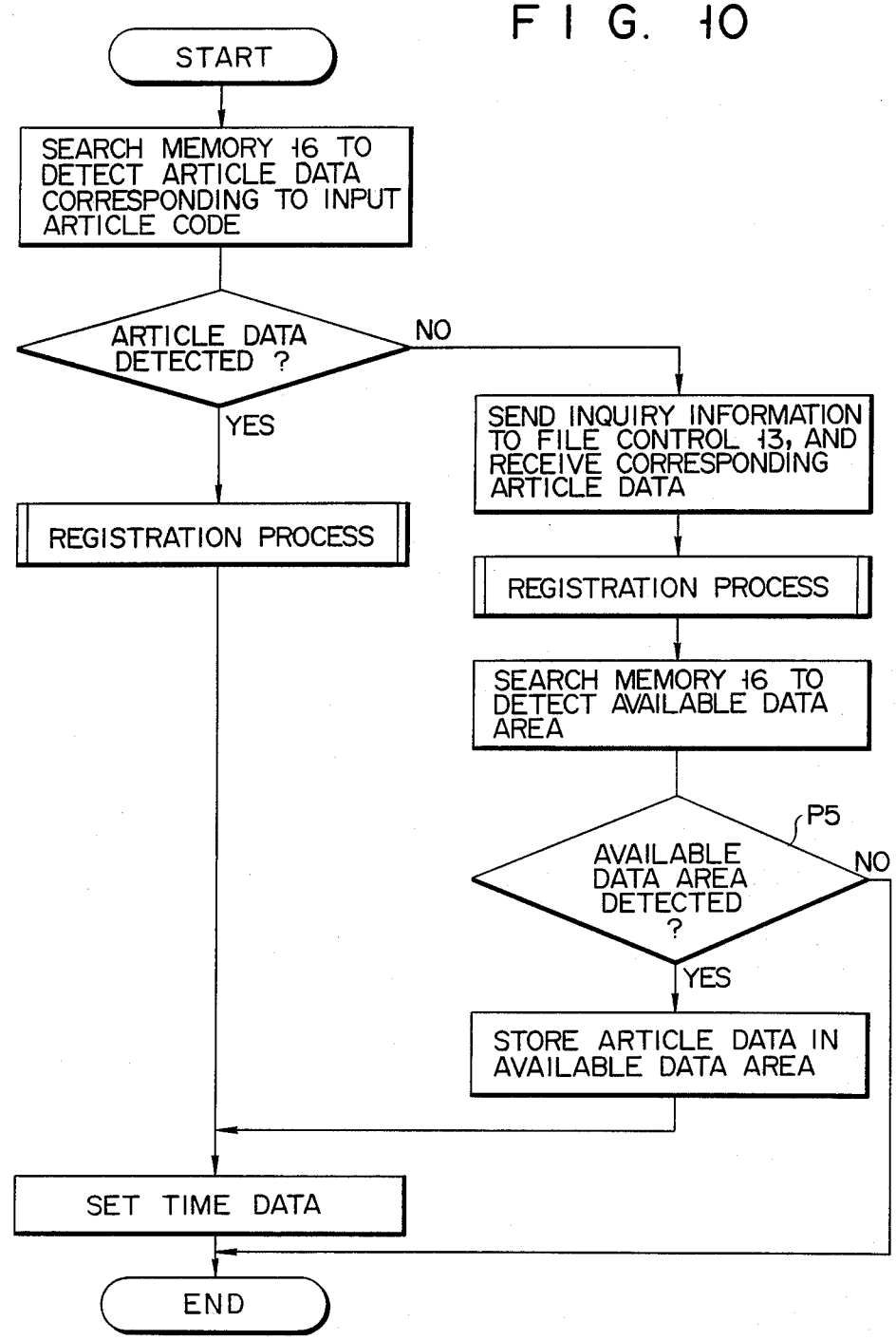
FIG. 10 is a flowchart of the registering operation executed by an ECR used in a POS system according to another embodiment of the invention.

FIG. 10 is a flowchart showing the operation of each electronic cash register in a POS system according to another embodiment of the present invention. A block diagram of the whole system, block diagram of each ECR, and construction of the memories for temporary storage and center file are the same as those in the embodiment shown in FIGS. 3 and 4.

In this embodiment, the article data is inputted from file control unit 13 in step P5. When available data area 31 is detected in memory 16, the updating of the article data associated with the old time data in memory 16 is not executed during the sales data registration of this article.

Figure 11:
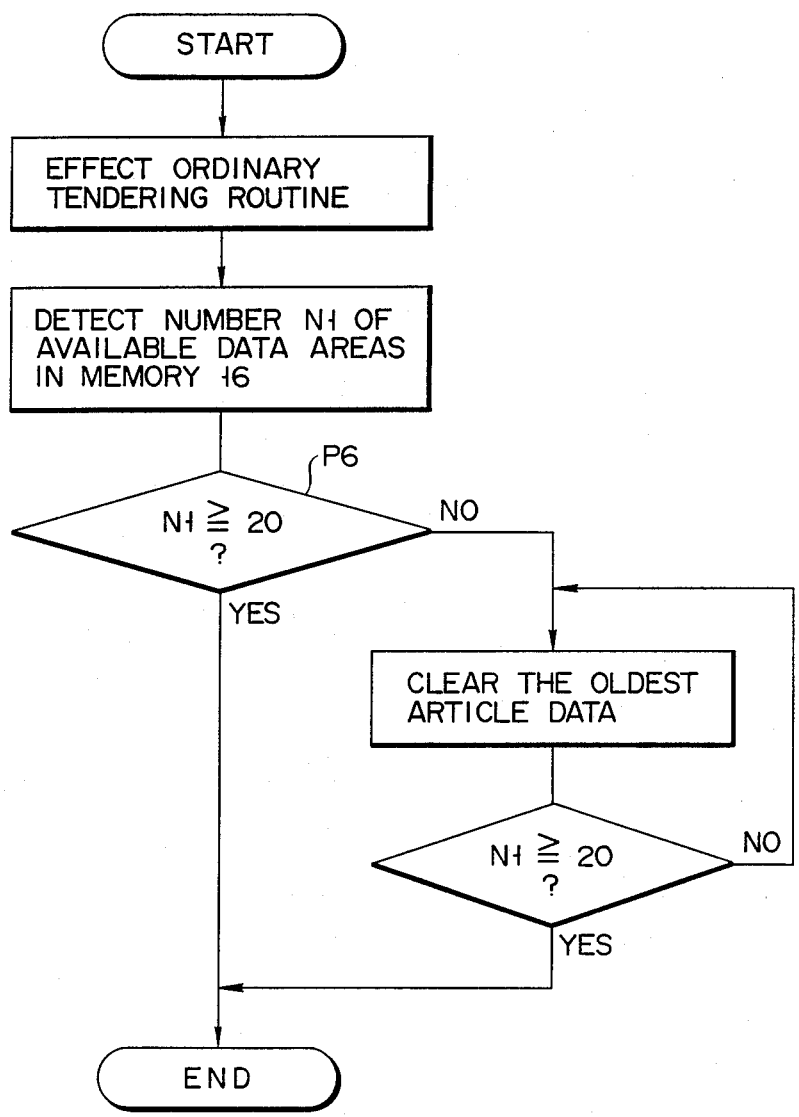
FIG. 11 is a flowchart of the tendering routine which is executed after completion of the registering operation shown in FIG. 10.

FIG. 11 shows the tendering routine in the case where a tendering command is inputted by the key operation of keyboard 20 in this embodiment. Namely, when the tendering command is inputted from keyboard 20 after completion of the registration process shown in FIG. 10 for all of the articles sold to one customer, there is executed the ordinary tendering routine such as the calculation of the amount of sales, display by display section 23, print and output onto a receipt, registration into the sales totalization file, and the like.

Next, available data area 31 in memory 16 is searched. When it is detected in step P6 that the number $N_1$ of available data areas is less than a predetermined limit number of 20, the time data in time area 32 is searched and the article data is sequentially deleted from the oldest time data until the number of available data areas 31 becomes 20.

When it is detected that twenty or more available data areas 31 exist in step P6, it is unnecessary to delete the old article data.

In the POS system constituted as described above, after completion of the sales data registration for one customer, twenty or more available data areas 31 in memory 16 can be certainly held. As mentioned above, it is considered that a probability that the number of articles whose article data is not stored in memory 16 and which are included in the articles which will be sold to one customer exceeds twenty is very small. Therefore, it is possible to reduce the number of execution times of the rewriting process of the memory content such as the deletion of the article data and storage of new article data and the like in memory 16 during the sales data registration. Thus, the processing speed of the sales data registration to one customer can be improved and the services can be also improved. In addition, since money is transferred and received between the customer and the cashier after completion of the tendering operation, ECR 11 is generally in the state of idle time during this period and the old article data in memory 16 is deleted in this idle time.

Figure 12:
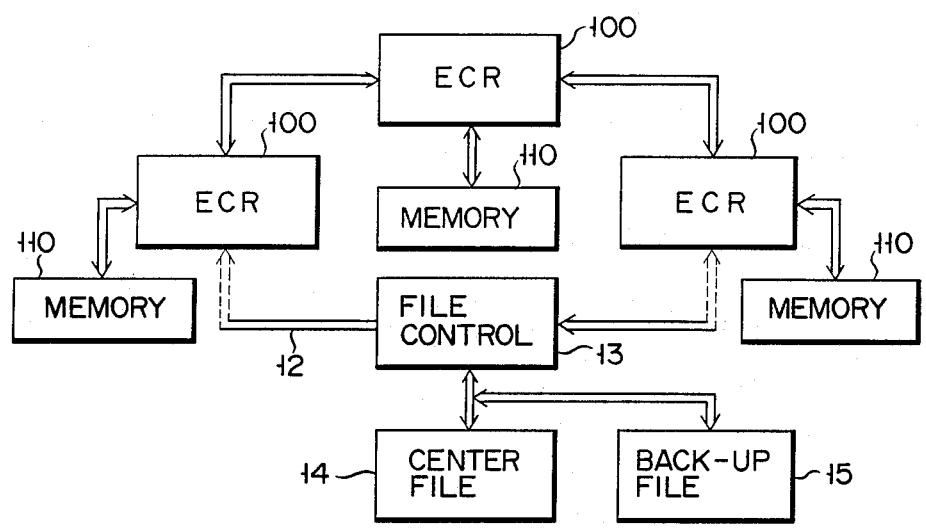
FIG. 12 is a block diagram of the POS system according to another embodiment of the invention.
Figure 13:
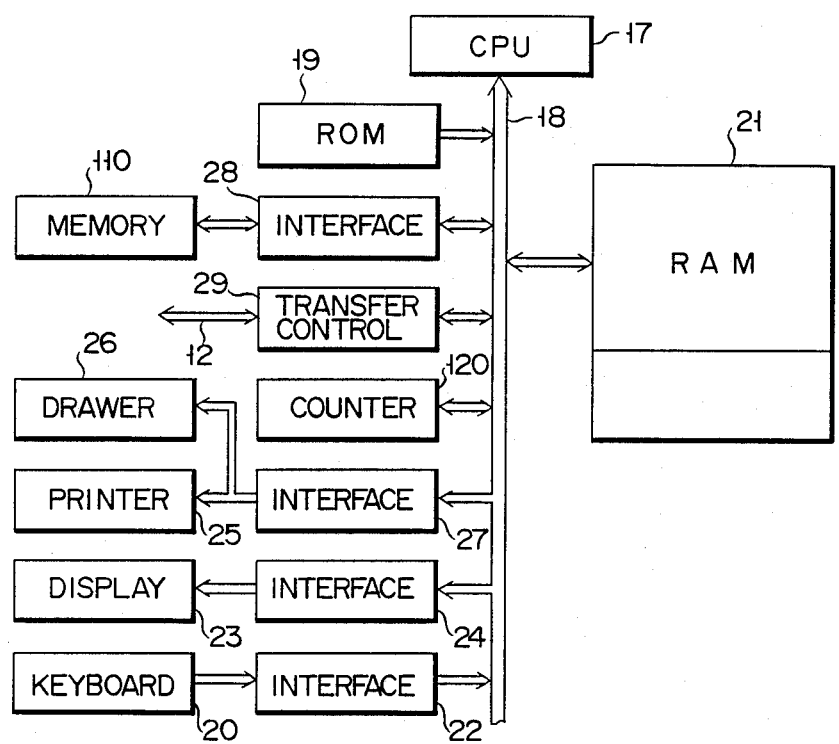
FIG. 13 is a block diagram of an electronic cash register used in the POS system shown in FIG. 12.

FIG. 12 shows a POS system according to another embodiment of the present invention. FIG. 13 is a block diagram of an electronic cash register 100 for use in the POS system shown in FIG. 12. ECR 100 is constituted in a manner similar to that shown in FIG. 4 except that a memory 110 for temporary storage and a registration number counter 120 are used in place of memory 16 and timer 30.

Figure 14:
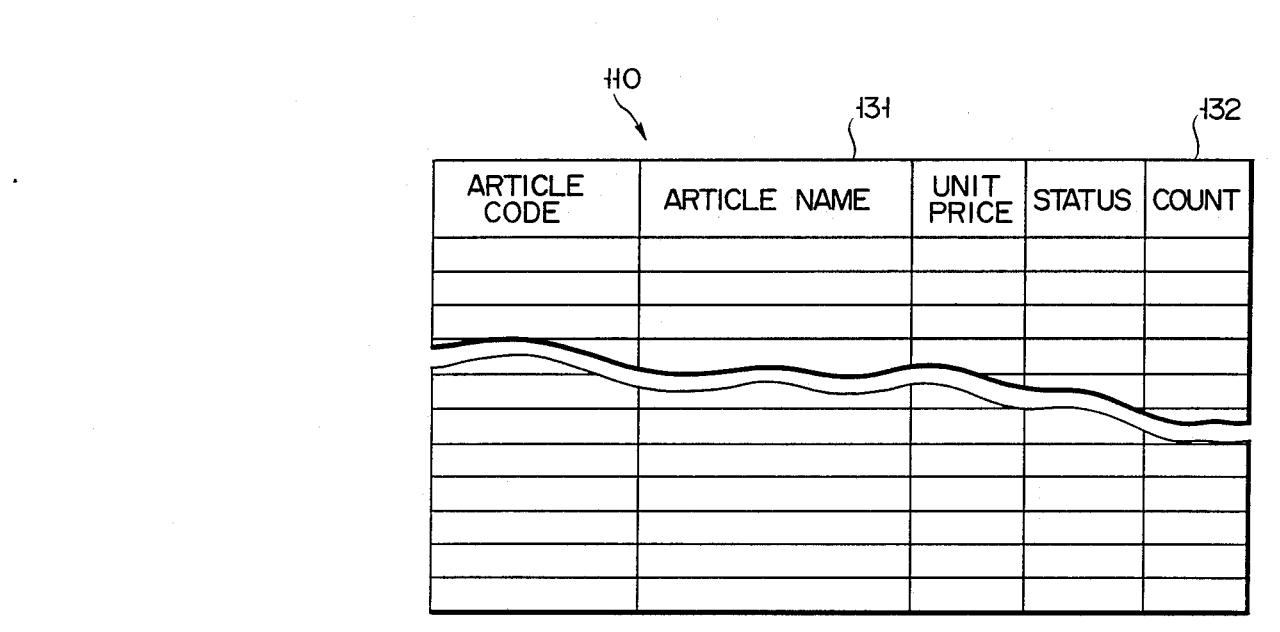

Registration number counter 120 counts the number of execution times of the sales data registration for the sold articles, namely, the total number of sold articles. In addition, as shown in FIG. 14, data areas 131 and counter areas 132 are formed in each memory 110. Data area 131 stores the article data including the article name, unit price, and status of the relevant article for each article code such as a PLU code or the like. Counter area 132 stores the count value of counter 120 when the article data in data area 131 is searched and the sales data processing operation is executed using the article data. A predetermined constant number of (e.g., 100) data areas 131 and counter areas 132 are provided.

Figure 15:
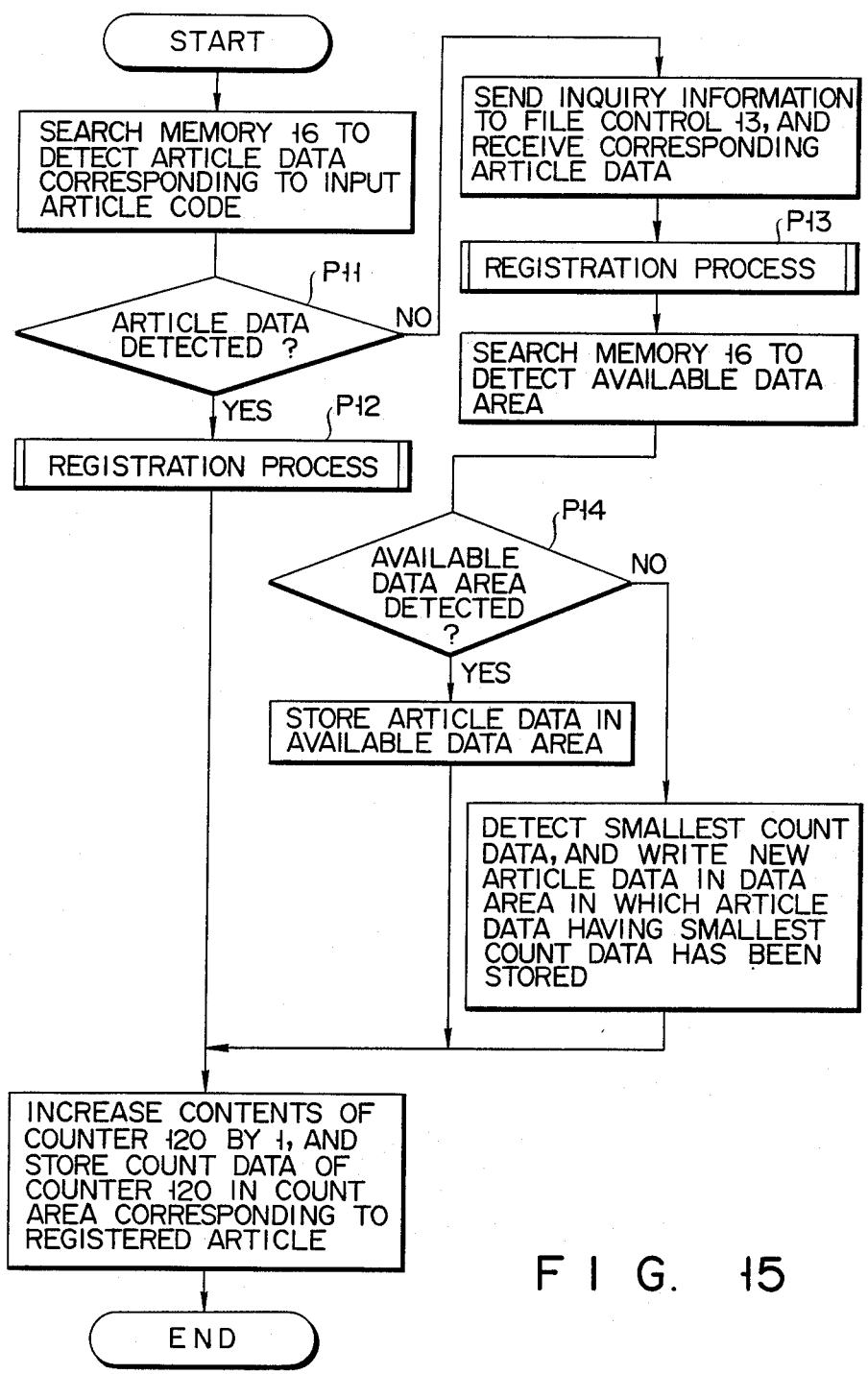
FIG. 15 is a flowchart of the registering operation executed by the ECR shown in FIG. 13.

When the article code of the sold article is inputted from keyboard 20 to CPU 17 of ECR 100 through keyboard interface 22, CPU 17 executes the sales data registration process for one article in accordance with a flowchart of FIG. 15. Namely, memory 110 is searched according to the article code inputted. When the relevant article code is detected in memory 110 in step P11, the article data such as the article name, unit price, status, and the like is read out from data area 131 corresponding to this article code. In the next step P12, a process similar to the sales data registration processing operation shown in FIG. 8 is executed on the basis of the article data.

After completion of the sales data registration process in step P12 in FIG. 15, the number of registration times (count value) of counter 120 is increased by 1 and thereafter the increased count value is read out and stored into counter area 132 of the relevant article code in memory 110. In this manner, the sales data registration process of one article is completed.

When the relevant article code is not detected in memory 110 in step P11, the inquiry information including this article code is transferred to file control unit 13. When the article data of the relevant article code read out from center file 14 of file control unit 13 is inputted through transmission path 12 and transfer control circuit 29, the same sales data registration processing operation as that in step P12 is executed using the input article data in step P13. After completion of the processing operation in step P13, data area 131 in memory 110 is searched to see if an available data area is detected or not. When available data area 131 is detected in step P14, the article data derived from file control unit 13 at this time is stored into this available data area 131.

When no available data area 131 in memory 110 is detected in step P14, the article data which has been stored in data area 131 corresponding to the smallest count value among the count values stored in all counter areas 132 is deleted. The input article data from file control unit 13 at this time is stored into this data area 131. Thereafter, the value of counter 120 is increased by 1 and the increased count value is set into counter area 132 corresponding to the input article code.

Figure 16:
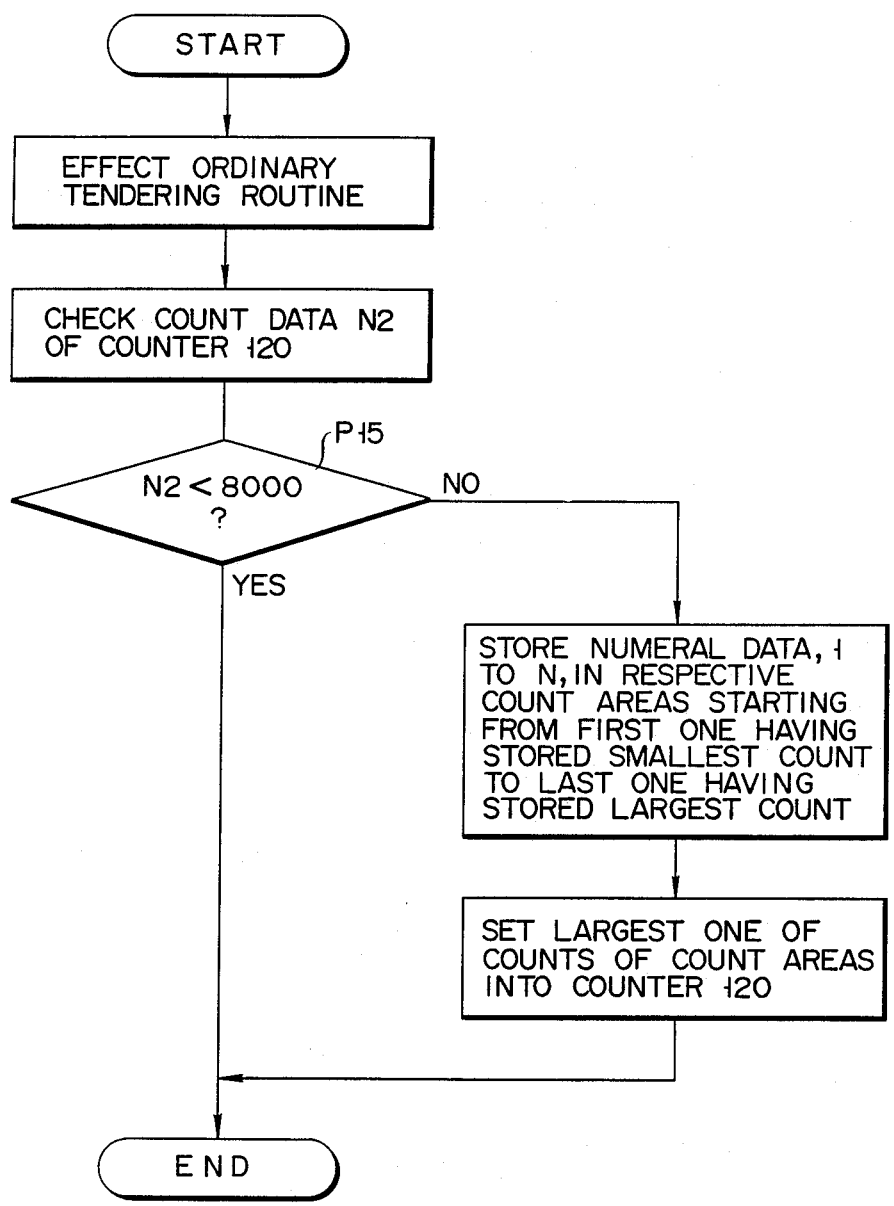
FIG. 16 is a flowchart of the tendering routine executed after completion of the registering operation shown in FIG. 15.

FIG. 16 shows the tendering routine in the case where a tendering command was inputted by the key operation of keyboard 20. Namely, when the tendering command is inputted from keyboard 20 after completion of the registration process shown in FIG. 15 with respect to all of the articles sold to one customer, the ordinary tendering routine such as the calculation of the amount of sales, display by display section 23, print onto a receipt, registration into the sales totalization file, and the like is executed.

Next, a count value $N_2$ of counter 120 is checked. When it is detected in step P15 that the count value $N_2$ of the counter is a predetermined limit number of 8000 or more, the count value in counter areas 132 are respectively replaced by 1 to 100, for example, in accordance with the sequence of the numbers of the count value. Namely, "1" is stored as a new count value into one of counter areas 132 in which the minimum count value has been stored and "2" is written as a new count value into another counter area 132 in which the second smallest count value has been stored. In this manner, the count values in all counter areas 132 are rewritten to the successive values starting from 1. After completion of the rewriting, the count value in counter area 132 which was finally rewritten, namely, the maximum count value is set to counter 120.

In the POS system constituted as described above, the article data and sales data for all of the articles which will be sold by ECRs 100 are stored in center file 14 associated with file control unit 13. However, the article data of the article which was inquired from ECR 100 to file control unit 13 and the count value of counter 120 when the article data was searched, namely, when the article of this article data was sold and registered are stored in memory 110 of ECR 100. When the article is sold and registered, the count value of counter area 132 corresponding to this article is obviously updated to a new count value. Therefore, a large count value is always stored in counter area 132 for the article which is frequently sold. On the contrary, the count value of counter area 132 for the article which is not so frequently searched, in other words, the article which is rarely sold has few opportunities of updating; therefore, even if the number of times of sales data registration for all articles increases, the count value is held to a small value.

On the other hand, when no available data area 131 in memory 110 is detected, the count values of counter areas 132 searched are sequentially rewritten to new article data starting from the smallest count value. Thus, the article data of the articles which are frequently sold is always stored in memory 110. Consequently, the number of inquiring operations of the article data to file control unit 13 from ECR 100 is remarkably decreased and an amount of data which is transferred through transmission path 12 is also reduced. At the same time, the number of processes in each ECR 100 and file control unit 13 can be also reduced and the processing efficiency of the whole POS system can be improved. Thus, a larger number of electronic cash registers 100 can be connected to single file control unit 13 in the POS system.

In the POS system of the invention, even if transmission path 12 fails, each ECR 100 can execute the sales data registration with respect to the article data stored in its own memory 110; therefore, the ratio of troubles to the customer decreases.

As will be obvious from the graph shown in FIG. 9, for example, the articles within a range of 0 to 20% as shown by the hatched portion occupy 60% or more of all the sold articles. Therefore, for example, by setting the number of data areas 131 in memory 110 of each ECR 100 to the value of 20% of all articles, there is no need to inquire the article data to file control unit 13 with respect to 60% or more of articles to be sold and registered by each ECR 100. Thus, the number of inquiring times can be remarkably reduced by merely providing memory 110 having a small memory capacity.

On the other hand, for example, when eight thousand articles are sold and the count value of counter 120 exceeds the limit value of 8000, count values of counter areas 132 in memory 110 are rewritten to successive values starting from 1 such that a large count value may be rewritten into a large one of successive values when the sales data processing operation for one customer is finished. Simultaneously, the maximum count value after the rewriting is set into counter 120. In this manner, when the number of all sold articles exceeds the limit value, small initial values are automatically written into counter areas 132 in the memory with the information of sales frequency maintained. Therefore, there is no need for the operator (cashier) of each ECR 11 to perform the initializing operation of counter 120 and counter area 132 in memory 110. In addition, since the initialization is automatically performed at the timing responsive to the end of the sales data registration for one customer, the waiting time of the customer for the initialization processing operation period is eliminated.

In addition, the memory capacity of each counter area 132 in memory 110 is sufficient only if numerals of up to four digits can be stored. Therefore, even if this counter area 132 is provided, the memory capacity will not be remarkably increased in particular.

Figure 17:
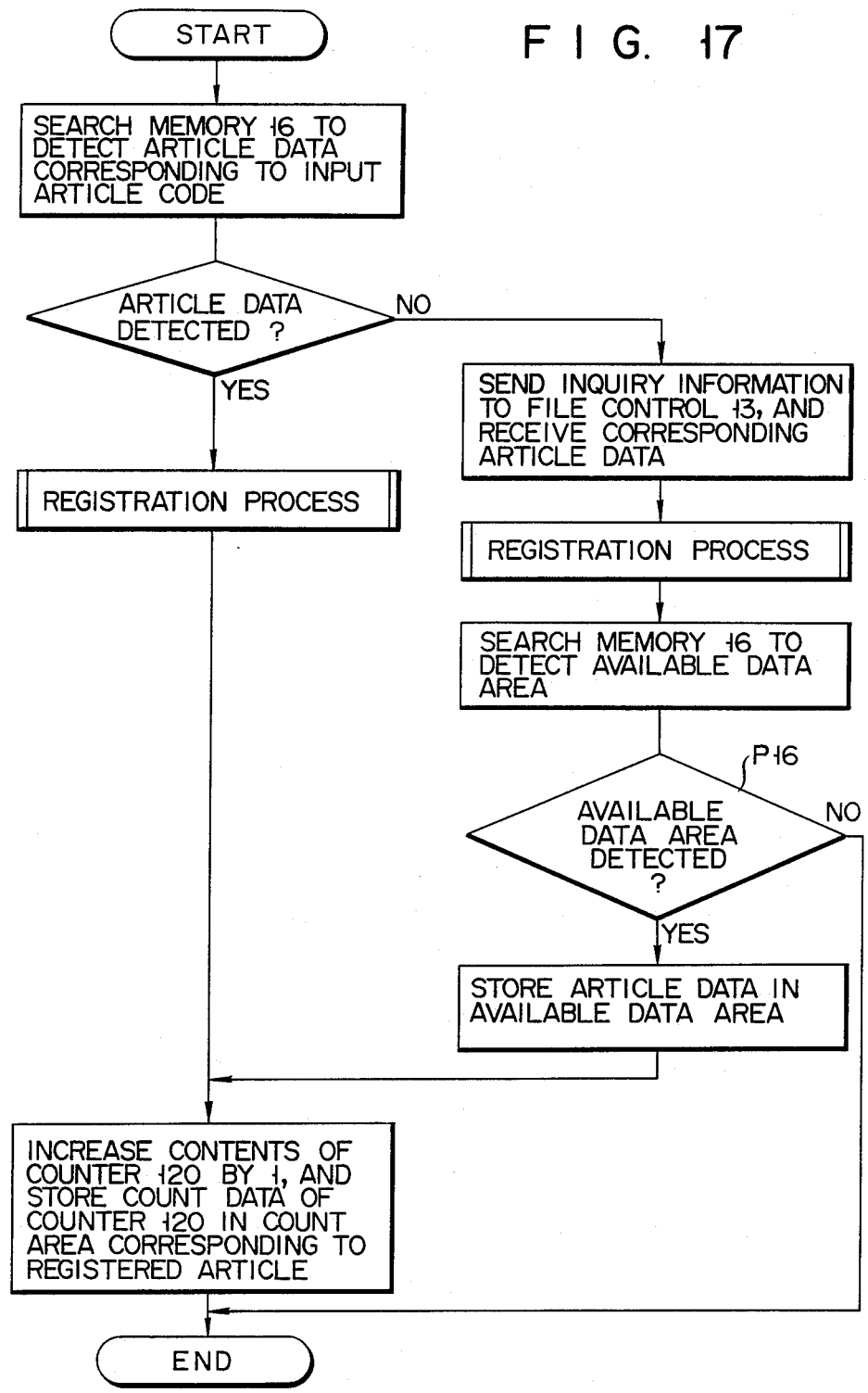
FIG. 17 is a flowchart of the registering operation executed by an ECR used in a POS system according to still another embodiment of the invention.

FIG. 17 is a flowchart showing the operation of each electronic cash register of a POS system according to still another embodiment of the invention. A block diagram of the whole system, a block diagram of each ECR, and construction of the memory for temporary storage and center file are the same as those in the embodiment shown in FIGS. 12 and 13.

In this embodiment, when the article data is inputted from file control unit 13 and it is detected that no available data area 131 exists in memory 110 in step P16, the updating of the article data corresponding to the smallest count value of memory 110 is not executed during the sales data registration of this article.

Figure 18:
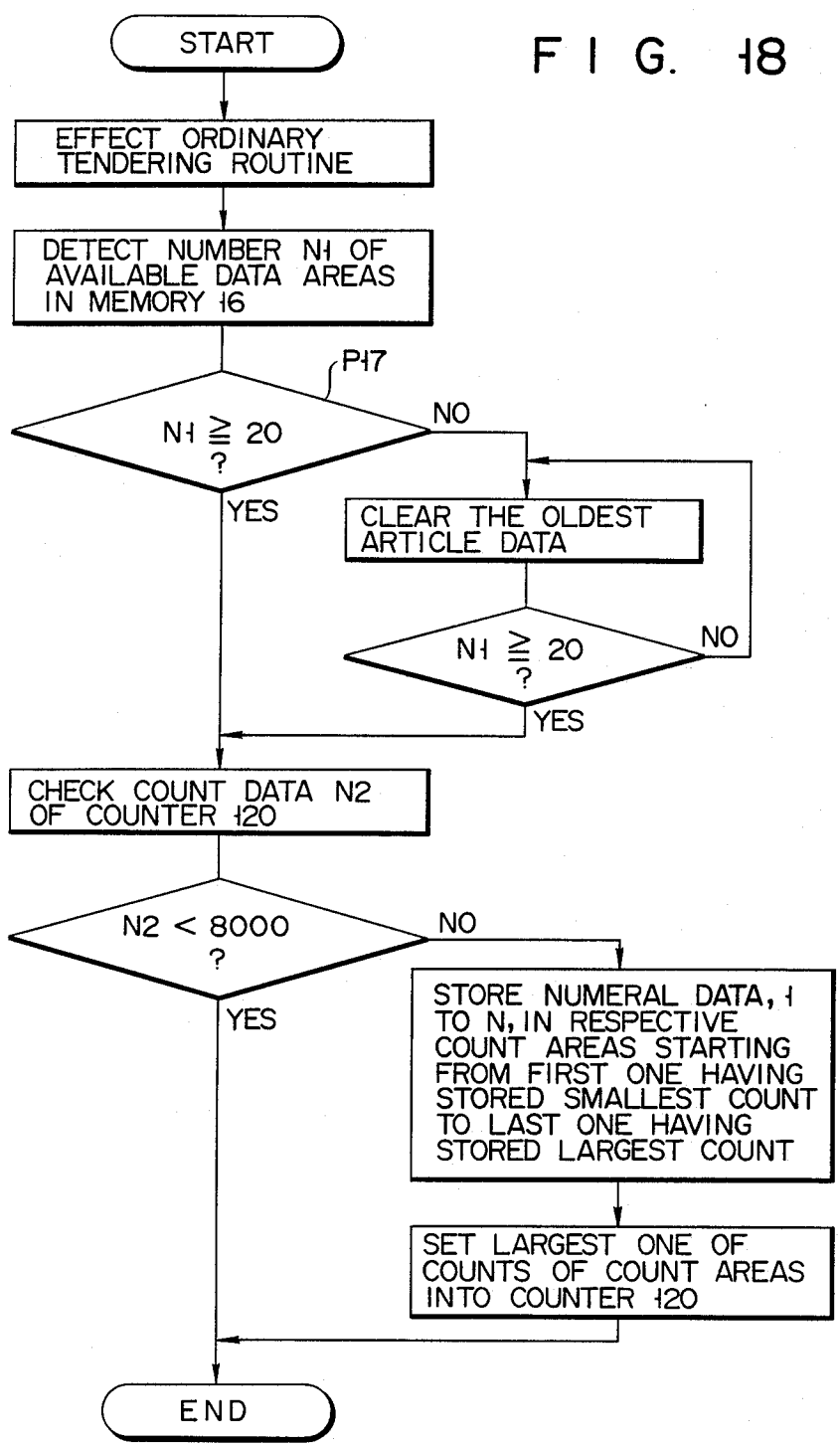
FIG. 18 is a flowchart of the tendering routine executed after completion of the registering operation shown in FIG. 17.

FIG. 18 shows the tendering routine when the tendering command is inputted by the key operation of keyboard 20 in this embodiment. Namely, when the tendering command is inputted from keyboard 20 after completion of the sales data registration process shown in FIG. 17 with respect to all of the sold articles to one customer, the ordinary tendering routine such as the calculation of the amount of sales, display by display section 23, print onto a receipt, registration into the sales totalization file, and the like is executed.

Next, data areas 131 in memory 110 are searched to see if an available data area exists therein or not. When the number $N_1$ of available data areas is less than a predetermined limit number of 20 in step P17, counter areas 132 are searched and the article data is deleted from data areas 131 in a sequence starting from the smallest counter value until the number of available data areas becomes 20.

When twenty or more available data areas 131 are detected in step P17, there is no need to delete the article data.

Thereafter, the operation similar to that described in conjunction with FIG. 16 is executed.

In the POS system constituted as explained above, after completion of the sales data registration for one customer, twenty or more available data areas 131 in memory 110 can be certainly held. As mentioned above, it is considered that a probability that the number of articles whose article data is not stored in memory 110 among the articles to be sold to one customer exceeds 20 is very small. Therefore, it is possible to reduce the number of execution times of the rewriting process of the memory content such as the deletion of the article data and storage of the new article data and the like into memory 110 during the sales data registration. The processing speed of the sales data registration process for one customer can be improved and the services can be also improved. On one hand, since money is transferred and received between the customer and the cashier after completion of the tendering operation, ECR 100 is ordinarily set in the idle state during this tendering operation, and the old article data in memory 110 is deleted for this idle time.

The present invention is not limited to the foregoing embodiments. For example, the number of data areas 31 or 131 in memory 16 or 110, number of available data areas which are made available after the tendering operation, limit number of counter 120 are not limited to the values in the above embodiments but may be arbitrarily set in dependence on the location where the POS system is installed, kinds of articles which are sold, and the like. Further, memories 16 and 110 can be omitted and the corresponding memory areas may be also formed in RAM 21.

As described above, according to the present invention, each electronic cash register is equipped with memory for temporary storage into which a preset number of article data which are frequently used are eventually stored. Therefore, an amount of data which is transferred between each ECR and the file control unit can be reduced without remarkably increasing the memory capacity of each ECR. The operating efficiency of the whole sales data registration can be improved. Further, the services to the customers can be also improved.

What is claimed is:

1. A point of sale (POS) system, comprising:
    file control means including a center file for storing article data such as unit prices of a plurality of articles corresponding to various kinds of article codes and sales data such as an amount of sales, and a file control unit for reading out the corresponding article data from said center file in accordance with an input inquiry information and also updating the corresponding sales data in said center file on the basis of the input sales data; and a plurality of electronic cash registers each of which is connected to said file control means and includes input means for inputting the article code, memory means having a predetermined number of data areas each for storing the article data, and a control circuit for searching the article data in said memory means in accordance with the article code which is inputted from said input means for (1) when it is detected that the article data corresponding to said input article code is stored in said memory means, executing a sales data processing operation based on this article data and supplying the resultant sales data to said file control unit, or (2) when it is detected that the article code corresponding to the input article code is not stored in said memory means, sending this article code as said inquiry information to said file control unit, storing the article data corresponding to said inquiry information and transferred from said file control unit into the data area in said memory means, and executing the sales data processing operation on the basis of this article data, wherein each of said electronic cash registers has data generating means for generating sequential count data for any of said articles at determined intervals, and the control circuit of each said electronic cash registers attaches the sequential count data from said data generating means to the article data corresponding to the input article code each time a transaction occurs for any of said articles wherein the article data is stored into said memory means or after the article data is read out from said memory means, so that the occurrence of the last transaction for a given article of any of said articles can be determined relative to later transactions for remaining ones of said articles.

2. A point of sale (POS) system, comprising:

file control means including a center file for storing article data such as unit prices of a plurality of articles corresponding to various kinds of article codes and sales data such as an amount of sales, and a file control unit for reading out the corresponding article data from said center file in accordance with an input inquiry information and also updating the corresponding sales data in said center file on the basis of the input sales data; and a plurality of electronic cash registers each of which is connected to said file control means and includes input means for inputting the article code, memory means having a predetermined number of data areas each for storing the article data, and a control circuit for searching the article data in said memory means in accordance with the article code which is inputted from said input means for (1) when it is detected that the article data corresponding to said input article code is stored in said memory means, executing a sales data processing operation based on this article data and supplying the resultant sales data to said file control unit, or (2) when it is detected that the article code corresponding to the input article code is not stored in said memory means, sending this article code as said inquiry information to said file control unit, storing the article data corresponding to said inquiry information and transferred from said file control unit into the data area in said memory means, and executing the sales data processing operation on the basis of this article data, wherein each of said electronic cash registers has data generating means for generating sequential count data for any of said articles at determined intervals, and the control circuit of each of said electronic cash registers attaches the sequential count data from said data generating means to the article data corresponding to the input article code each time a transaction occurs for any of said articles wherein the article data is stored into said memory means or after the article data is read out from said memory means, so that the occurrence of the last transaction for a given article of any of said articles can be determined relative to later transactions for remaining ones of said articles, and when it is detected that the article data corresponding to the input article code is not stored in said memory means, the article data corresponding to said input article code is transferred from said file control unit and is stored into the available data area in the memory means, and when no available data area exists in the memory means, the article data corresponding to said input article code is written into the data area in which the article data having sequential count data indicative of the oldest transaction has been stored.

3. A POS system according to claim 2, wherein said data generating means is a timer, and when the article data corresponding to said input article code is written into said memory means, the control circuit of a corresponding one of said electronic cash registers attaches a time data from said timer to said article data and then writes the time and article data into the data area, and when the article code data corresponding to said input article code is read out from said memory means, the control circuit of said corresponding electronic cash register replaces a time data attached to said article data stored in said memory means by a current time data from said timer.

4. A POS system according to claim 2, wherein said data generating means is a timer, and when the article data corresponding to said input article code is written into said memory means, the control circuit of a corresponding one of said electronic cash registers attaches a time data from said timer to said article data and then writes the time and article data into the data area, and when the article code data corresponding to said input article code is read out from said memory means, the control circuit of said corresponding electronic cash register replaces a time data attached to said article data stored in said memory means by a current time data from said timer, and further when it is detected that the number of available data areas in said memory means is smaller than a predetermined value in a tendering routine, the article data having the time data indicative of the last order is deleted and this operation is repeatedly effected until the number of said available data areas becomes said predetermined value.

5. A POS system according to claim 2, wherein said data generating means is a counter, and when the article data corresponding to said input article code is written into said memory means, the control circuit of a corresponding one of said electronic cash registers attaches a count data of said counter to said article data and writes the count and article data into the data area and updates the content of the counter, and when the article data corresponding to said input code is read out from said memory means, the control circuit of said corresponding electronic cash register replaces a count data attached to the article data stored in said memory means by a current count data of said counter.

6. A POS system according to claim 5, wherein, when a count data of said counter has reached a preset value, the control circuit of a corresponding one of said electronic cash registers attaches sequential counts to the article data stored in said memory means starting from the article data which has the count data indicating the oldest transaction toward the article data which has the count data indicating the newest transaction.

7. A POS system according to claim 2, wherein said data generating means is a counter, and when the article data corresponding to said input article code is written into said memory means, the control circuit of a corresponding one of said electronic cash registers attaches a count data of said counter to said article data and writes the count and article data into the data area and updates the content of the counter, and when the article data corresponding to said input code is read out from said memory means, the control circuit of said corresponding electronic cash register replaces a count data attached to said article data stored in said memory means by a current count data from said counter, and further when it is detected that the number of available data areas in said memory means is smaller than a predetermined value in a tendering routine, the article data having the count data indicative of the oldest transaction is deleted and this operation is repeated until the number of said available data areas becomes said predetermined value.

8. A POS system according to claim 2, wherein each of said electronic cash registers has data generating means for generating relative timing data indicative of the relative timing at which the respective article data was written into said memory means, and the control circuit of each of said electronic cash registers attaches the relative timing data indicative of the newest relative timing from said data generating means to the article data corresponding to the input article code each time this article data is stored into said memory means, and when it is detected that the article data corresponding to the input article code is not stored in said memory means, the article data corresponding to said input article code and transferred from said file control unit is stored into the available data area in the memory means, and when no available data area exists in the memory means, the article data corresponding to said input article code is written into the data area in which the article data having the relative timing data indicative of the oldest relative timing has been stored, and further when it is detected that the number of available data areas in said memory means is smaller than a predetermined value in a tendering routine, the article data having the relative timing data indicative of the oldest relative timing is deleted and this operation is repeatedly effected until the number of said available data areas becomes said predetermined value.

* * * * *

UNITED STATES PATENT AND TRADEMARK OFFICE
CERTIFICATE OF CORRECTION

PATENT NO. : 4,870,577
DATED : September 26, 1989
INVENTOR(S) : KARASAWA et al

It is certified that error appears in the above-identified patent and that said Letters Patent is hereby corrected as shown below:

In the title page, column 1, the second inventor's name should read --Yuzo Minakuchi--.

Signed and Sealed this

Fourth Day of December, 1990

Attest:

HARRY F. MANBECK, JR.

*Attesting Officer*      *Commissioner of Patents and Trademarks*